C. L. McCUEN.
BELT TIGHTENING MECHANISM.
APPLICATION FILED JAN. 21, 1918.
1,401,169.
Patented Dec. 27, 1921.
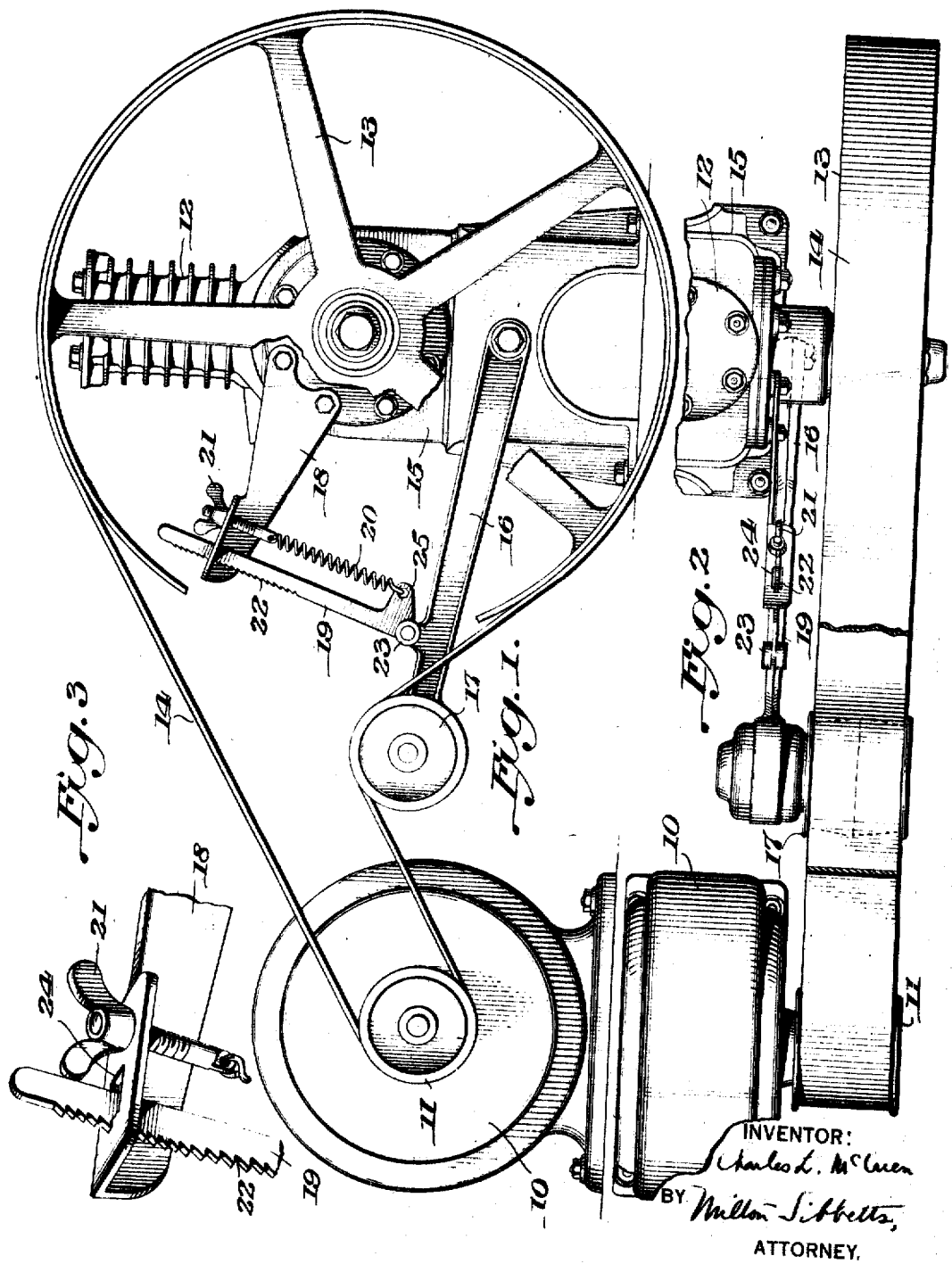
INVENTOR:
Charles L. McCuen
BY Milton S. Ibbetts,
ATTORNEY.

UNITED STATES PATENT OFFICE.

CHARLES L. McCUEN, OF DETROIT, MICHIGAN, ASSIGNOR, BY MESNE ASSIGNMENTS, TO THE ISKO COMPANY, OF CHICAGO, ILLINOIS, A CORPORATION OF DELAWARE.

BELT-TIGHTENING MECHANISM.

1,401,169.   Specification of Letters Patent.   Patented Dec. 27, 1921.

Application filed January 21, 1918. Serial No. 213,012.

*To all whom it may concern:*

Be it known that I, CHARLES L. McCUEN, a citizen of the United States, and resident of Detroit, Wayne county, State of Michigan, have invented certain new and useful Improvements in Belt-Tightening Mechanisms, of which the following is a specification.

This invention relates to belt tightening mechanism and particularly to the automatic type of such mechanism. In the single illustrative form of the invention herein shown it is applied to the driving mechanism between an electric motor and a compressor such as is used in a small refrigerating apparatus, but it is not limited to that particular application.

In the use of the usual belt tightener involving a yieldingly mounted vibrating pulley in a driving mechanism of the form above referred to, it has been found that excessive vibration of the pulley took place due in part to the uneven impulses of the compressor, and this vibration caused the lubricating oil of the pulley to be thrown from its shaft thus making necessary more frequent oiling and resulting in a very dirty machine. This objection made such belt tighteners prohibitive for apparatus to be used in connection with domestic refrigerators.

One of the objects of the present invention is to prevent the harmful vibration of the pulley of a belt tightening mechanism and thus retain the oil in the bearings.

Another object of the invention is to simplify the construction of automatic belt tightening mechanisms and to render them more efficient.

Other objects of the invention will appear from the following description taken in connection with the drawings, which form a part of this specification, and in which:

Figure 1 is a side elevation of a motor and compressor driving mechanism with a belt tightening mechanism embodying my invention applied thereto;

Fig. 2 is a plan view of Fig. 1; and

Fig. 3 is a fragmentary perspective view of the ratchet and spring tightening devices.

Referring to the drawings, 10 represents an electric motor having a driving pulley 11, and 12 is a compressor having a large driven pulley 13. A driving belt 14 connects the pulleys 11 and 13, whereby the compressor is driven by the motor.

The compressor 12 comprises a frame or base 15 which may form the support for the belt tightening mechanism. Said mechanism comprises a swinging arm 16 having a pulley 17, a stationary bracket 18, a rack bar 19, and a spring 20. The arm 16 is so mounted that its pulley 17 bears against the belt 14 to automatically tighten the latter by taking up the slack. The arm is yieldingly swung upwardly by the spring 20 extending between it and the bracket 18, the tension of the spring being regulated by the thumb nut 21 as is clear from Figs. 1 and 3.

Vibration of the pulley 17 or retraction of the arm 16 is prevented by the rack bar 19, the ratchet teeth 22 of which bear against the bracket 18. Said rack bar is pivoted to the arm 16 at 23 and extends through a slot 24 in the bracket 18, and the spring 20, instead of being connected directly to the arm 16, has its lower end secured to a lateral finger 25 near the lower end of the bar thus making the bar and spring substantially parallel. By this arrangement the spring device 20 is common to the tightener mechanism and the retaining device, or in other words, the spring 20 operates the arm 16 to yieldingly hold the pulley 17 against the belt, and at the same time it actuates the ratchet, keeping the teeth 22 in yielding contact with the bracket 18, so that as the belt stretches and the arm 16 is moved upwardly slightly, the rack bar 19 retains it and prevents the pulley 17 from vibrating and throwing the oil.

It will be understood that my invention is not limited to the details of construction shown and other forms may be used without departing from the spirit or scope of the invention.

Having thus described my invention, what I claim and desire to secure by Letters Patent is:—

1. The combination with a driving belt, of a tightening pulley bearing thereon, a stationary bracket, and means connecting said pulley with the bracket to automatically tighten the belt and retain the pulley in tightening position.

2. The combination with a driving belt, of a tightening pulley bearing thereon, a stationary bracket, and means connecting said pulley with the bracket to automatically move the pulley toward tightening position and retain it in such position.

3. The combination with a driving belt, of a tightening pulley bearing thereon, a ratchet device connected to said pulley, and a spring device connected to operate said pulley toward tightening position and to actuate said ratchet device.

4. The combination with a driving belt, of a tightening pulley, means to move the pulley toward tightening position, and means to retain the pulley in such position, a single spring device forming part of both said means.

5. The combination with a driving belt, of automatic means for tightening said belt and retaining it so tightened, said means including a single spring only.

6. The combination with a driving belt, of automatic means for tightening said belt, and a ratchet device for retaining said means, said means and said device having a common operating spring.

7. The combination with a driving belt, of a tightening pulley, a spring for operating said pulley, and a ratchet device to prevent return action of the pulley, said device being actuated by said spring.

8. In a belt driving mechanism, the combination with a driving pulley, a driven pulley, and a belt connecting said pulleys, of a tightening pulley, a swinging arm for the latter pulley, a ratchet device for said arm, and a spring connected to operate said arm and said device.

9. In a belt driving mechanism, the combination with a driving pulley, a driven pulley, and a belt connecting said pulleys, of a tightening pulley, a swinging arm for the latter pulley, a bracket, a rack bar connected to said arm and operating against said bracket, and a spring so connected to said bar and bracket as to operate said arm toward tightening position and retain said bar against said bracket.

10. In a belt driving mechanism, the combination with a driving pulley, a driven pulley, and a belt connecting said pulleys, of a tightening pulley, a swinging arm for the latter pulley, a bracket, a rack bar pivoted to the arm and operating with its rack against said bracket, said bar having a lateral finger, and a spring extending from said bracket to said finger to draw the arm toward said bracket and retain the rack bar against said bracket.

11. In a belt driving mechanism, the combination with a driving pulley, a driven pulley, and a belt connecting said pulleys, of a tightening pulley, a swinging arm for the latter pulley, a bracket, a rack bar pivoted to the arm and operating with its rack against said bracket, said bar having a lateral finger, and a spring extending from said bracket to said finger substantially parallel to said rack bar to draw the arm toward said bracket and retain the rack bar against said bracket.

In testimony whereof I affix my signature.

CHARLES L. McCUEN.